United States Patent
Cowd et al.

(10) Patent No.: US 9,335,873 B2
(45) Date of Patent: May 10, 2016

(54) METHOD OF COMPENSATING FOR RETRANSMISSION EFFECTS IN A TOUCH SENSOR

(71) Applicants: Edward Cowd, Southampton (GB);
Darren Golbourn, Southampton (GB);
Weidong He, Southampton (GB);
Thomas Myers, Southampton (GB);
Martin J. Simmons, Whiteley (GB);
Predrag D. Vukovic, Chandler's Ford (GB)

(72) Inventors: Edward Cowd, Southampton (GB);
Darren Golbourn, Southampton (GB);
Weidong He, Southampton (GB);
Thomas Myers, Southampton (GB);
Martin J. Simmons, Whiteley (GB);
Predrag D. Vukovic, Chandler's Ford (GB)

(73) Assignee: Atmel Corporation, San Jose, CA (US)

( * ) Notice: Subject to any disclaimer, the term of this patent is extended or adjusted under 35 U.S.C. 154(b) by 195 days.

(21) Appl. No.: 13/922,871

(22) Filed: Jun. 20, 2013

(65) Prior Publication Data
US 2014/0375592 A1 Dec. 25, 2014

(51) Int. Cl.
*G06F 3/042* (2006.01)
*G06F 3/044* (2006.01)
*G06F 3/041* (2006.01)

(52) U.S. Cl.
CPC .............. *G06F 3/044* (2013.01); *G06F 3/0418* (2013.01); *G06F 3/0425* (2013.01)

(58) Field of Classification Search
CPC ................................ G06F 3/0425; G06F 3/044
USPC .................................................. 345/173–174
See application file for complete search history.

(56) References Cited

U.S. PATENT DOCUMENTS

| | | |
|---|---|---|
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2009/0315854 A1 | 12/2009 | Matsuo |
| 2011/0279409 A1* | 11/2011 | Salaverry et al. ............. 345/174 |
| 2012/0098783 A1 | 4/2012 | Badaye et al. |

(Continued)

FOREIGN PATENT DOCUMENTS

WO WO 2012/129247 9/2012

OTHER PUBLICATIONS

U.S. Appl. No. 61/454,936, filed Mar. 21, 2011, Myers.

(Continued)

*Primary Examiner* — Nicholas Lee
*Assistant Examiner* — Abdul-Samad A Adediran
(74) *Attorney, Agent, or Firm* — Baker Botts L.L.P.

(57) ABSTRACT

In one embodiment, a method of compensating for retransmission effects in a touch sensor includes, in response to measuring a touch input on a display, generating a first matrix comprising a plurality of first measurements associated with a plurality of capacitive nodes of a touch sensor. The method also includes estimating an amount of retransmission associated with the touch input by generating a first vector comprising one or more second measurements associated with one or more first electrode lines of the touch sensor, generating a second vector comprising one or more third measurements associated with one or more second electrode lines of the touch sensor, and calculating an outer product of the first and second vectors. The method includes generating a revised indication of the touch input based on the first matrix and the estimated amount of retransmission.

17 Claims, 4 Drawing Sheets

(56) References Cited

U.S. PATENT DOCUMENTS

| | | |
|---|---|---|
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0071092 A1* | 3/2014 | Shih et al. ............... 345/175 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

\* cited by examiner

METHOD OF COMPENSATING FOR RETRANSMISSION EFFECTS IN A TOUCH SENSOR

TECHNICAL FIELD

This disclosure generally relates to touch sensors, and more particularly to a method of compensating for retransmission effects in a touch sensor.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine the position of the change in capacitance on the touch screen.

DESCRIPTION OF EXAMPLE EMBODIMENTS

In particular embodiments of a touch sensor, the touch sensor is arranged in rows and columns of electrode lines, with each row including a drive line and each column including a sense line. In that arrangement, capacitance may be measured by sequentially exciting each drive line with an electrical pulse and measuring the response on each sense line. This method of measurement is generally referred to as a mutual capacitance measurement. The goal of the mutual capacitance measurement is to provide the change in capacitance between a drive line and a sense line, which may indicate the presence and extent of a touch. However, the charge of a touch that is not properly grounded may pass from the drive line to the sense line instead of passing to ground completely, which may distort the measured signal. This effect is called retransmission.

Retransmission in a touch sensor causes several undesirable effects. First, retransmission may cause a touch-sensor controller to interpret a single large touch as multiple touches. Second, retransmission may reduce a signal's touch amplitude, which reduces the accuracy of the touch position estimate. For example, a touch-sensor controller may erroneously interpret a touch in the top-left portion of the screen as a touch in the top-center portion of the screen. Third, retransmission may reduce the values of the touch amplitude so much that an "anti-touch" is created, which can cause large touch break-up, incorrect touch amplitude measurement, and reduced touch position accuracy. Finally, retransmission may even cause the complete disappearance of touches. Thus, according to the teachings of the disclosure, it is desirable to compensate for retransmission in a touch sensor.

Accordingly, aspects of the present disclosure include, in one embodiment, a method of compensating for retransmission effects in a touch sensor. Tire touch-sensor controller, in response to measuring a touch input, generates a first matrix comprising a plurality of first measurements associated with a plurality of capacitive nodes of a touch sensor. The first measurements (e.g., mutual capacitance measurements) may each indicate a capacitance associated with one of the plurality of capacitive nodes. The touch-sensor controller estimates an amount of retransmission by generating a first vector comprising one or more second measurements associated with one or more first electrode lines (e.g., self-capacitance measurements), generating a second vector comprising one or more third measurements associated with one or more second electrode lines (e.g., self-capacitance measurements), and calculating an outer product of the first vector and the second vector. The touch-sensor controller generates a revised indication of the touch input based on the first matrix and the estimated amount of retransmission.

Figure 1:
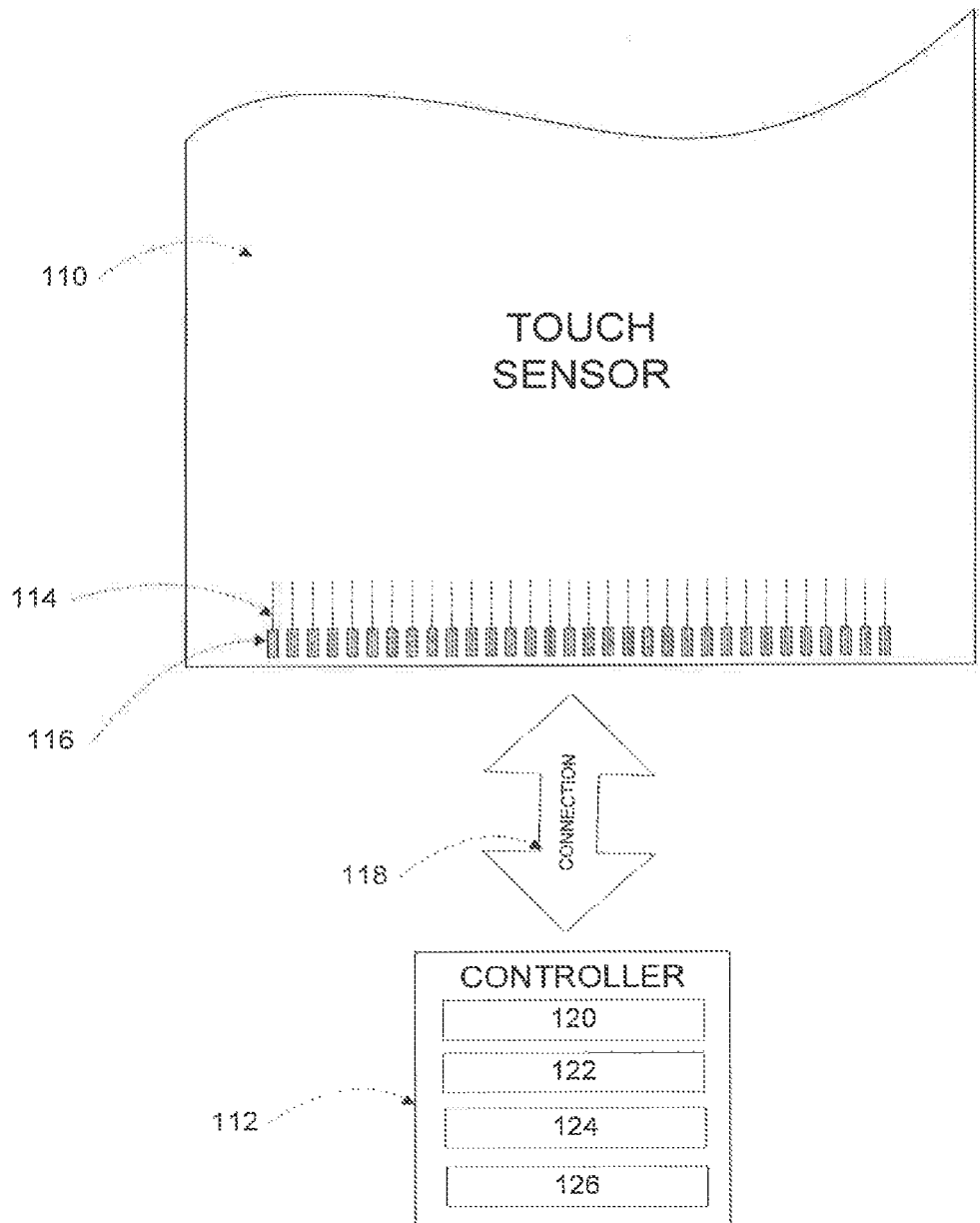
FIG. 1 illustrates an example touch sensor with an example touch-sensor controller, according to certain embodiments of the present disclosure.
Figure 2:
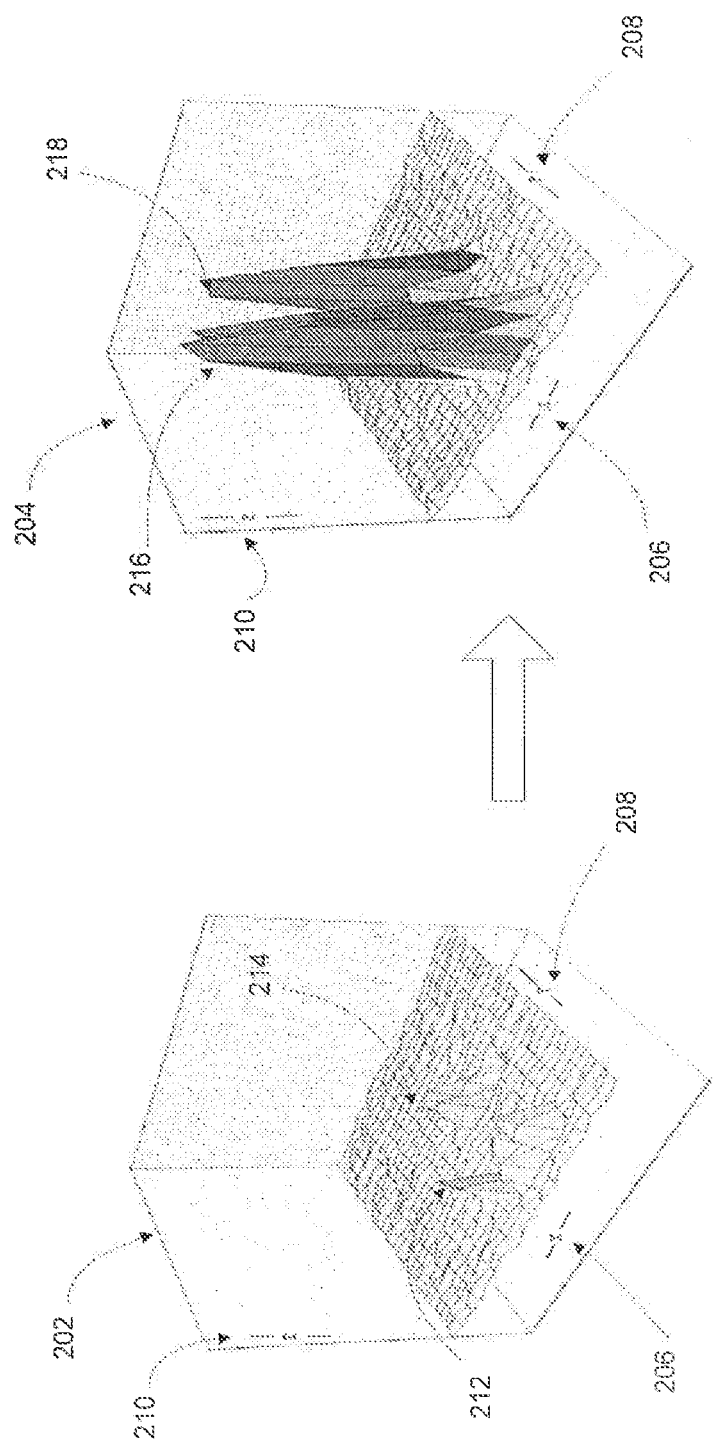
FIG. 2 illustrates an example of data representing a touch before and after compensating for retransmission effects, according to certain embodiments of the present disclosure.
Figure 3A:
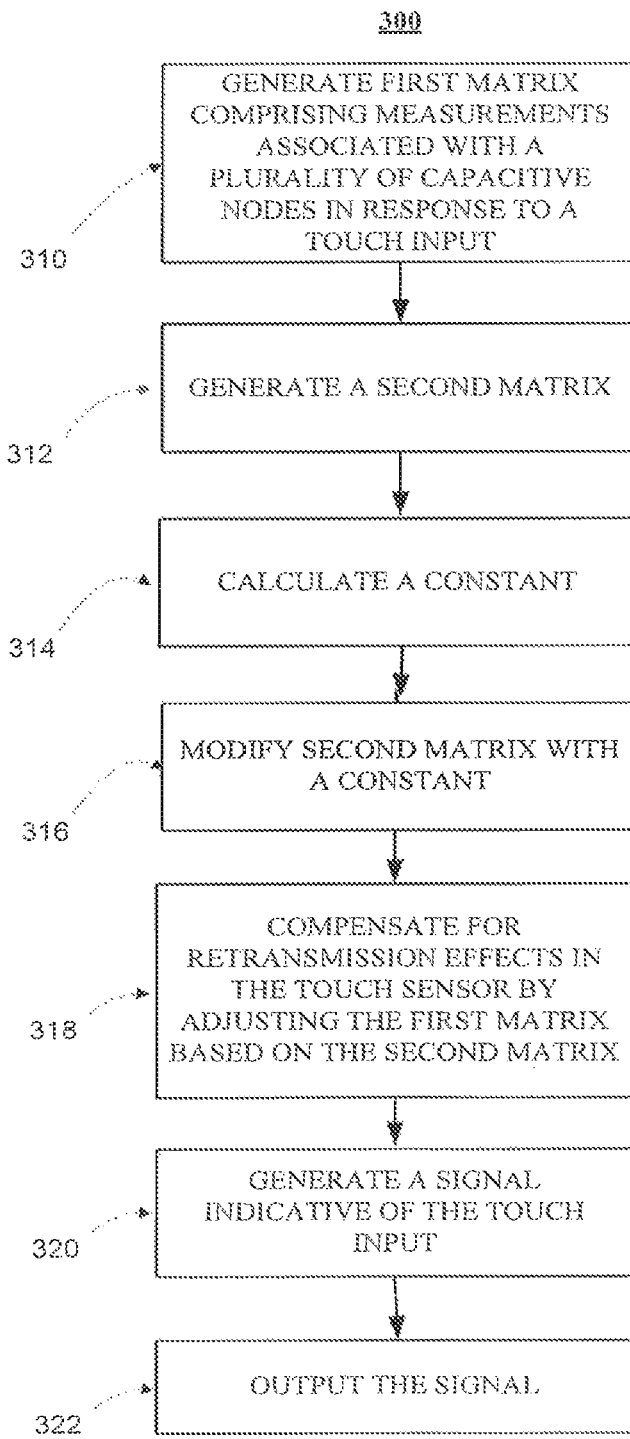
FIG. 3A is a flow chart illustrating an example method of compensating for retransmission effects in a touch sensor, according to certain embodiments of the present disclosure.
Figure 3B:
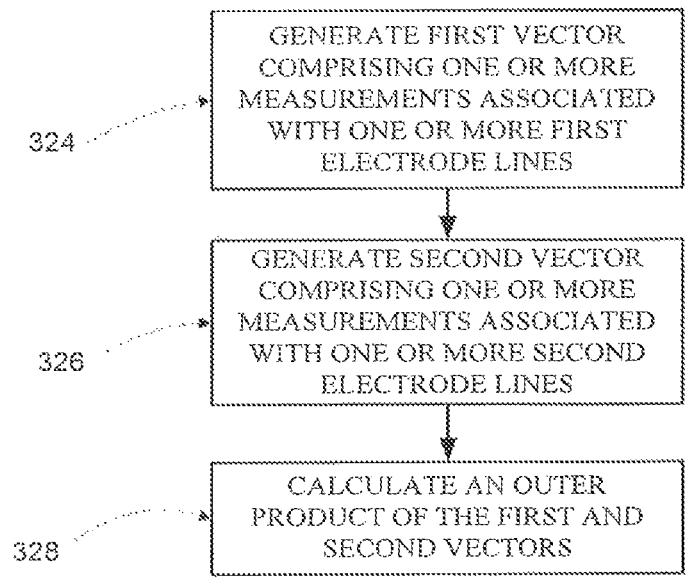
FIG. 3B is a flow chart illustrating an example method for the step of generating a second matrix introduced in FIG. 3A, according to certain embodiments of the present disclosure.

Additional details are discussed in FIGS. 1 through 3B. FIG. 1 shows an example touch sensor and FIG. 2 shows data representing a touch before and after compensating for retransmission effects in the touch sensor. FIG. 3A shows an example method of compensating for retransmission effects, and FIG. 3B shows an example method for the step of generating a second matrix introduced in FIG. 3A.

FIG. 1 illustrates an example touch sensor 110 with an example touch-sensor controller 112, according to certain embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by we of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming, the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made, of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 110 may be made of polyethylene terephthalate (PET) or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor ITO may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 110 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 110 may have drive electrodes disposed in a pattern on one side of a substrate and sense electrodes disposed in a pattern on another side of the substrate. Moreover, touch sensor 110 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 312 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit 120, a drive unit 122, a sense unit 124, and a storage unit 126. Drive unit 122 may supply drive signals to the drive electrodes of touch sensor 110. Sense unit 124 may sense charge at the capacitive nodes of touch sensor 110 and provide measurement signals to processor unit 120 representing capacitances at the capacitive nodes. Processor unit 120 may control the supply of drive signals to the drive electrodes by drive unit 122 and process measurement signals from sense unit 124 to detect and process the presence and location of a touch or proximity input within the touch-sensitive area(s) of touch sensor 110. Processing measurement signals may include filtering, calculating gradients, and restructuring the measurement signals to more accurately represent the touch or proximity input. The processor unit may also track changes in the position of a touch or proximity input within the touch-sensitive area(s) of touch sensor 110. Storage unit 126 may store programming for execution by processor unit 120, including programming for controlling drive unit 122 to supply drive signals to the drive electrodes, programming for processing measurement signals from sense unit 124, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which drive unit 122 of touch-sensor controller 112 may supply drive signals to the drive electrodes. Other tracks 114 may provide sense connections for coupling touch-sensor controller 112 to sense electrodes of touch sensor 110, through which sense unit 124 of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 nm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

FIG. 2 illustrates an example of data representing a touch before and after compensating for retransmission effects in a touch sensor (such as touch sensor 110 of FIG. 1), according to certain embodiments of the present disclosure. Graph 202 represents touch amplitude data before compensating for retransmission effects, and graph 204 represents touch amplitude data after compensating for retransmission effects for the same touch. Coordinates along x-axis 206 and coordinates along y-axis 208 represent electrode lines of a touch sensor, such as touch sensor 110 of FIG. 1. Values along z-axis 210 represent the touch amplitude for a touch on a touch screen. While graphs 202 and 204 represent the electrode lines as a grid of coordinates along x-axis 206 and y-axis 208, the physical electrode lines on touch sensor 110 may run in any suitable orientation or pattern.

A touch on a touch screen may be represented by increased capacitance amplitude values. For example, graph 202 illustrates two simultaneous touches on a touch screen, such as a thumb and forefinger. In this example, peak 212 and peak 214 represent touch amplitude values for the thumb touch and the forefinger touch, respectively. Because of retransmission effects in the electrode lines caused by the touch, the touch amplitude values near peak 212 and peak 214 are reduced. Retransmission effects not only reduce the accuracy of the touch amplitude measurement, but may also cause inaccurate touch position estimation, a single large touch being reported as multiple touches, or even the complete disappearance of a touch. For example, peak 212 is not a well-defined peak, which may cause touch-sensor controller 112 to interpret the singe large touch that created peak 212 as multiple touches. That effect is known as large touch break-up.

Graph 204 is a representation of the same touches from graph 202 compensated tin retransmission effects using the method illustrated in FIGS. 3A-3B. Peak 216 and peak 218 represent compensated touch amplitude values for the same touches illustrated in graph 202. Peak 216 and peak 218 have increased touch amplitude values compared to peak 212 and peak 214, which increases the accuracy of touch position estimation and reduces the likelihood of a complete disappearance of a touch. Moreover, peak 216 is now a well-defined peak indicating that the touch is a single touch. Because peak 216 is now a well-defined peak, the likelihood that touch-sensor controller 112 will interpret the single touch as multiple touches is reduced. A method for correcting retransmission effects in a touch sensor is described more fully below with respect to FIGS. 3A-3B.

FIG. 3A is a flow chart illustrating an example method of compensating for retransmission effects in a touch sensor, according to certain embodiments of the present disclosure. Step 310, in an embodiment, is associated with generating a first matrix comprising a plurality of measurements in response to measuring a touch input on a display. Steps 312-316 are associated with estimating an amount of retransmission and steps 318-322 are associated with generating a revised indication of the touch input in an embodiment.

Method 300 begins at step 310 where touch-sensor controller 112 generates a first matrix comprising a plurality of measurements associated with a plurality of capacitive nodes of touch sensor 110 in response to measuring a touch input on a display in an embodiment. In another embodiment, logic stored in storage unit 126 may generate a first matrix. Each of the measurements may be indicative of a capacitance associated with a corresponding one of the capacitive nodes in certain embodiments. Touch-sensor controller 112 may generate the first matrix by sequentially exciting each drive line with an electrical pulse and measuring the response on each sense line, which results in a capacitance measurement for each capacitance node. As discussed above, each capacitive node may be formed by the intersection of a drive line and sense line at an x-coordinate and a y-coordinate of touch sensor 110. This measurement is often referred to as a mutual capacitance measurement. Each of the mutual capacitance measurements (e.g., a capacitance at a capacitive node having an x-coordinate and a y-coordinate) may then be used to generate the first matrix. Accordingly, each element in the first matrix may indicate a measured value of a capacitance at a corresponding capacitive node in certain embodiments. In some embodiments, each element in the first matrix may indicate a measured value for a change in capacitance at a corresponding capacitive node.

The first matrix is sized according to the number of drive and sense electrode lines in touch sensor 110 in certain embodiments. For example, touch sensor 110 arranged with M drive lines and N sense lines will produce a matrix of M*N elements. As noted above, each element of the first matrix indicates a capacitance associated with a corresponding one of the capacitive nodes. The first matrix may appear as follows:

$$M = \begin{bmatrix} C_{x_0 y_0} & C_{x_0 y_1} & \cdots \\ C_{x_1 y_0} & C_{x_1 y_1} & \cdots \\ \vdots & \vdots & \ddots \end{bmatrix}$$

in this example first matrix, one element is $C_{x_0 y_0}$, which may indicate a measured value of a capacitance of a capacitive node located at the intersection of drive line $x_0$ and sense line $y_0$. Another element of this matrix is $C_{x_1 y_1}$, which may indicate a measured value of a capacitance of a capacitive node located at the intersection of drive line $x_1$ and sense line $y_1$. In these examples, the measured value may indicate a change in capacitance of a capacitive node. The dotted lines in this example indicate that the first matrix may be any size. In an embodiment, the measurements may be raw measurements uncompensated for retransmission effects. Without compensating the mutual capacitance measurements for retransmission, many of the undesirable retransmission effects may occur in touch sensor 110 as noted above.

Steps 312-316 are associated with estimating an amount of retransmission in a touch sensor in an embodiment. At step 312, touch-sensor controller 112 generates a second matrix for compensating retransmission effects in an embodiment. In other embodiments, logic stored in storage unit 126 generates the second matrix. The second matrix is generally an estimation of an amount of retransmission that may be used to adjust the first matrix. An example method for generating the second matrix is illustrated in FIG. 3B and discussed in detail below.

At step 314, touch-sensor controller 112 calculates a constant in certain embodiments. Generally, the constant, which may be called retransmission gain, represents a degree of retransmission compensation needed. In certain embodiments, touch-sensor controller 112 may calculate the constant based on an estimated total number of capacitive nodes touched, which may be a function of the total capacitance and the self-capacitance measurements discussed below. Touch-sensor controller 112 may calculate the constant based on a touch grounding condition of a received touch in certain embodiments. For example, if a touch is properly grounded, then the constant may be calculated to be nearly zero because the amount of retransmission is minimal such that compensation may not be needed. However, if the touch is poorly grounded, then the constant may be calculated to be nearly one because the amount of retransmission may be high. In that situation, retransmission compensation is needed to prevent the effects of retransmission. In certain embodiments, touch-sensor controller 112 may calculate the constant based on any one or more of the above factors. For example, the constant may be a function of the total mutual capacitance, self-capacitance, and touch grounding condition. Although various examples of methods for calculating the constant are discussed above, other methods for calculating the constant may be used.

An example method for calculating the constant is shown in the following pseudo code for the procedure Calculate_gain:

measurements from touch sensor 110 as discussed below. Some advantages of correcting the uncompensated mutual capacitance measurements are increasing touch position estimation accuracy, increasing the accuracy of touch amplitude data, and reducing the likelihood that a touch will completely disappear.

At step 320, touch-sensor controller 112 generates a signal indicative of the touch input in an embodiment. For example, once touch-sensor controller 112 adjusts the capacitance measurements in the first matrix with the estimated amount of retransmission in the second matrix, touch-sensor controller 112 generates a signal corrected for retransmission effects. At step 322, touch-sensor controller 112 may output the corrected signal. As a result, retransmission effects in touch sensor 110 are reduced.

As an example embodiment of operation, touch-sensor controller 112 may generate a first matrix comprising a plurality of measurements associated with a plurality of capacitive nodes of a touch sensor in response to a touch input. The touch input may be, for example, a large touch. Each of these measurements may indicate a capacitance associated with a corresponding one of the plurality of capacitive nodes. These measurements may be raw measurements that are not compensated and thus may be affected by retransmission. In such a case, the large touch may appear as multiple touches due to

```
01:  procedure Calculate_gain (M, Vx, Vy)
02:    sum_mutual = 0
03:    for x in range of 0 to Max_xline;
04:      for y in range of 0 to Max_yline:
05:        sum_mutual = sum_mutual + M[x,y]    ▷ calculate total touch capacitance
06:      end for y
07:    end for x
08:    sum_scx = 0
09:    for x In range of 0 to Max_xline:
10:      sum_scx = sum_scx + Vx[x]       ▷ self-capacitance measurements for electrodes
along an x-axis
11:    end for x
12:    sum_scy = 0
13:    for y in range of 0 to Max_yline:
14:      sum_scy = sum_scy + Vy[y]       ▷ self-capacitance measurements for electrodes
along an y-axis
15:    end for y
16:    gain = P1*(sum_scx – P2*sum_mutual) /sum_scx /sum_scy  ▷ calculate constant
17:    return gain
18:  end procedure
```

At step 316, touch-sensor controller 112 modifies the second matrix with a constant in an embodiment. In other embodiments, logic stored in storage unit 126 modifies the second matrix with a constant. In some embodiments, touch-sensor controller 112 may modify the second matrix by multiplying the second matrix by the constant. As discussed above, modifying the second matrix with the constant factors in a degree of retransmission compensation required.

Steps 318-322 are associated with generating a revised indication of a touch input in an embodiment. At step 318, touch-sensor controller 112 compensates for retransmission effects in touch sensor 110 by adjusting the first matrix based on the second matrix in an embodiment. In other embodiments, logic stored in storage unit 126 compensates for retransmission effects in touch sensor 110 by adjusting the first matrix based on the second matrix. In certain embodiments, touch-sensor controller 112 may adjust the first matrix by adding the second matrix to the first matrix. In this manner, the uncompensated mutual capacitance measurements are corrected using an estimate of an amount of retransmission in touch sensor 110, which is generated using self-capacitance retransmission. Touch-sensor controller 112 may then generate a first and a second vector. Each of the measurements in the first and second vectors may indicate a capacitance associated with an electrode line. Touch-sensor controller 112 may generate a second matrix, which may be an estimate of an amount of retransmission in touch sensor 110. Touch-sensor controller 112 may calculate a constant that represents a degree of retransmission compensation needed. Touch-sensor controller 112 may modify the second matrix with the constant. Touch-sensor controller 112 may compensate for retransmission effects by adjusting first matrix with second matrix. Touch-sensor controller 112 may generate a signal indicative of the touch input, such as a signal that indicates that the touch input was a single large touch as opposed to multiple touches. Touch-sensor controller 112 may output the signal. In other embodiments, the method 300 is performed by logic stored in storage unit 126.

An example method 300 is shown in the following pseudo code for the procedure Retransmission_Compensation_RUN:

```
1:  procedure Retransmission_Compensation_RUN (M, SC)
2:      Vx, Vy = Generate_Vectors(M, SC)       ▷ Generate first and second vectors
3:      gain = calculation_gain(M, Vx, Vy)     ▷ Calculate constant
4:      M = M + apply_compensation(gain, Vx, Vy)   ▷ Adjust first matrix using
second matrix
5:      return (M)
6:  end procedure
```

Method 300 illustrates an example method of operating touch-sensor controller 112 to compensate for retransmission effects. Modifications, additions, or omissions may be made without departing from the scope of this disclosure. Steps may be combined, modified, or deleted where appropriate, and additional steps may be added.

FIG. 3B illustrates an example method 312 implementing step 312 of method 300 to generate a second matrix described above in reference to FIG. 3A. Method 312 begins at step 324 where touch-sensor controller 112 generates a first vector comprising one or more measurements associated with one or more first electrode lines. Each element of the first vector may be a measurement indicative of a capacitance associated with a corresponding one of the one or more first electrode lines in certain embodiments. For example, each element may indicate a change in capacitance associated with an electrode line running along an x-axis of touch sensor 110. In an embodiment, the measurement may indicate a capacitance between a touch input and one of the one or more electrode lines.

As discussed above, touch sensor 110 may be arranged in rows and columns of electrode lines in an embodiment. In a self-capacitance implementation, touch-sensor controller 112 may measure the capacitance for each individual electrode line. The resulting measurements may be used to generate a vector. These measurements are generally known as self-capacitance measurements. For example, capacitance measurements for one or more electrode lines on an x-axis are used to generate a first vector, such as $[x_0, x_1, x_2]$, where each element is a measurement indicative of capacitance for an electrode line at that coordinate. In that example, the value of $x_0$ represents a measurement indicative of a capacitance for electrode line $x_0$, the value of $x_1$ represents a measurement indicative of a capacitance for electrode line $x_1$, and the value of $x_2$ represents a measurement indicative of a capacitance for electrode line $x_2$. In an embodiment, the number of elements in the first vector is dependent on the number of electrode lines associated with that vector. For example, if there are thirty electrode lines along an x-axis, the vector will be comprised of thirty capacitance measurements with each measurement associated with an electrode line. In certain embodiments, the signal used to generate the self-capacitance measurements may be conditioned before touch-sensor controller 112 measures the capacitance because the signal may be deteriorated due to environmental conditions, such as temperature. In an embodiment, conditioning ensures that the self-capacitance measurements are either zero or positive rather than a negative number. Although the above examples provide for the first vector comprising capacitance measurements along a particular axis, the first vector may include capacitance measurements for one or more electrode lines along any axis, such as the y-axis.

At step 326, touch-sensor controller 112 generates a second vector comprising one or more measurements associated with one or more second electrode lines in a similar manner as described in step 324 in an embodiment. For example, capacitance measurements for one or more electrode lines on a y-axis are used to generate a second vector, such as $[y_0, y_1, y_2]$, where each element is a measurement indicative of capacitance for the electrode line at that coordinate. In an embodiment, the number of elements in the second vector is dependent on the number of electrode lines associated with that vector. For example, if there are thirty electrode lines along an y-axis, the vector will be comprised of thirty capacitance measurements with each measurement associated with an electrode line. Although the example provides for the second vector comprising capacitance measurements for a particular axis, the second vector may include capacitance measurements for one or more electrode lines along any axis, such as the x-axis.

At step 328, touch-sensor controller 112 calculates an outer product of the first vector and the second vector in an embodiment. Generally, the outer product of the first and second vectors is an estimate for an amount of retransmission in the electrode lines of touch sensor 110. Outer product may refer to the tensor product of two vectors in an embodiment. The result of calculating the outer product for a pair of vectors may be a matrix. Accordingly, in certain embodiments, touch-sensor controller 112 uses the outer product of the first and second vectors discussed above to generate a second matrix. For example, touch-sensor controller 112 generates the second matrix by multiplying the first vector by the second vector to calculate an outer product that represents an amount of retransmission in the electrode lines of touch sensor 110. Thus, the outer product of the self-capacitance measurements provides an estimate of an amount of retransmission, which is used to adjust the mutual capacitance measurements in the first matrix to compensate for retransmission effects in touch sensor 110.

As an example embodiment of operation, touch-sensor controller 112 may receive signals indicative of capacitance associated with one or more electrode lines of touch sensor 110. Touch-sensor controller 112 may generate a first vector comprising one or more measurements associated with one or more first electrode lines. For example, each element of the first vector may indicate a capacitance associated with a corresponding one of one or more first electrode lines along an x-axis. Touch-sensor controller 112 may generate a second vector comprising one or more measurements associated with one or more second electrode lines. For example, each element of the second vector may indicate a capacitance associated with a corresponding one of one or more second electrode lines along a y-axis. Once the vectors are generated, touch-sensor controller 112 may calculate an outer product of the first and second vectors. This outer product may represent an estimate of an amount of retransmission in the electrode lines of touch sensor 110. Although method 312 is described above as being performed by touch-sensor controller 112 method 312 is performed by logic stored in storage unit 126 in other embodiments.

Method 312 illustrates an example method for implementing step 312 of method 300 to generate a second matrix. Modifications, additions, or omissions may be made without departing from the scope of this disclosure. Steps may be combined, modified, or deleted where appropriate, and additional steps may be added.

Certain embodiments of the invention may provide one or more technical advantages. In some embodiments, compensating for retransmission effects corrects erroneous touch amplitude data and reduces the likelihood that a single large touch will be interpreted as multiple touches. Additionally, compensating for retransmission effects increases the accuracy of touch position estimation and reduces the likelihood that touches will completely disappear.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of art apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for detecting a touch input comprising:
in response to measuring a touch input on a display, generating a first matrix comprising a plurality of first measurements associated with a plurality of capacitive nodes of a touch sensor, wherein each of the plurality of first measurements is indicative of a capacitance associated with a corresponding one of the plurality of capacitive nodes;
estimating an amount of retransmission associated with the touch input by performing operations comprising:
generating a first vector comprising one or more second measurements each indicative of a capacitance of a respective electrode line of a first plurality of electrode lines of the touch sensor in response to the touch input, wherein the first plurality of electrode lines are oriented along a first axis;
generating a second vector comprising one or more third measurements each indicative of a capacitance of a respective electrode line of a second plurality of electrode lines of the touch sensor in response to the touch input, wherein the second plurality of electrode lines are oriented along a second axis, the second axis being different than the first axis;
generating a second matrix by calculating an outer product of the first and second vectors; and
generating a revised indication of the touch input based on the first matrix and the second matrix.

2. The method of claim 1, wherein generating the revised indication comprises adjusting the first matrix using the second matrix.

3. The method of claim 2, wherein adjusting the first matrix using the second matrix comprises adding the second matrix to the first matrix.

4. The method of claim 1, wherein estimating an amount of retransmission further comprises:
calculating a constant; and
multiplying the outer product by the constant.

5. The method of claim 4, wherein the constant is calculated based on a total number of capacitive nodes of the touch sensor activated by the touch input.

6. The method of claim 1, wherein the capacitance of one of the first plurality of electrode lines-comprises the capacitance between the touch input and one of the first plurality of electrode lines.

7. The method of claim 1, wherein each of the capacitive nodes comprises an intersection point between one of the first plurality of electrode lines and one of the second plurality of electrode lines.

8. An apparatus comprising:
a display coupled to a touch sensor operable to receive a touch input;
a touch-sensor controller coupled to the touch sensor, the touch-sensor controller operable to:
in response to measuring the touch input, generate a first matrix comprising a plurality of first measurements associated with a plurality of capacitive nodes of the touch sensor, wherein each of the plurality of measurements is indicative of a capacitance associated with a corresponding one of the plurality of capacitive nodes;
estimate an amount of retransmission associated with the touch input by performing operations comprising:
generating a first vector comprising one or more second measurements each indicative of a capacitance of a respective electrode line of a first plurality of electrode lines of the touch sensor in response to the touch input, wherein the first plurality of electrode lines are oriented along a first axis;
generating a second vector comprising one or more third measurements each indicative of a capacitance of a respective electrode line of a second plurality of electrode lines of the touch sensor in response to the touch input, wherein the second plurality of electrode lines are oriented along a second axis, the second axis being different than the first axis;
generating a second matrix by calculating an outer product of the first and second vectors; and
generate a revised indication of the touch input based on the first matrix and the second matrix.

9. The apparatus of claim 8, wherein the touch-sensor controller is further operable to generate the revised indication by adjusting the first matrix using the second matrix.

10. The apparatus of claim 9, wherein adjusting the first matrix using the second matrix comprises adding the second matrix to the first matrix.

11. The apparatus of claim 8, wherein the touch-sensor controller is further operable to estimate the amount of retransmission by:
calculating a constant; and
multiplying the outer product by the constant.

12. The apparatus of claim 11, wherein the constant is calculated based on a total number of capacitive nodes of the touch sensor activated by the touch input.

13. The apparatus of claim 8, wherein each of the capacitive nodes comprises an intersection point between one of the first plurality of electrode lines and one of the second plurality of electrode lines.

14. One or more computer-readable non-transitory storage media embodying logic that is operable when executed to:
in response to measuring a touch input on a display, generate a first matrix comprising a plurality of first measurements associated with a plurality of capacitive nodes of a touch sensor, wherein each of the plurality of first measurements is indicative of a capacitance associated with a corresponding one of the plurality of capacitive nodes;

estimate an amount of retransmission associated with the touch input by performing operations comprising:

generating a first vector comprising one or more second measurements each indicative of a capacitance of a respective electrode line of a first plurality of electrode lines of the touch sensor in response to the touch input, wherein the first plurality of electrode lines are oriented along a first axis;

generating a second vector comprising one or more third measurements each indicative of a capacitance of a respective electrode line of a second plurality of electrode lines of the touch sensor in response to the touch input, wherein the second plurality of electrode lines are oriented along a second axis, the second axis being different than the first axis;

generating a second matrix by calculating an outer product of the first and second vectors; and generate a revised indication of the touch input based on the first matrix and the second matrix.

15. The media of claim 14, wherein the logic is further operable when executed to generate the revised indication by adjusting the first matrix using the second matrix.

16. The media of claim 15, wherein adjusting the first matrix using the second matrix comprises adding the second matrix to the first matrix.

17. The media of claim 14, wherein the logic is further operable when executed to estimate the amount of retransmission by:

calculating a constant; and multiplying the outer product by the constant.

* * * * *